United States Patent [19]
Stiles et al.

[11] Patent Number: 5,806,594
[45] Date of Patent: Sep. 15, 1998

[54] COMPOSITIONS AND METHODS FOR CEMENTING A WELL

[75] Inventors: David A. Stiles, New Orleans, La.;
Jean Mari Guy de Rozieres, deceased, late of Houston, Tex., by Sohela de Rozieres, executrix

[73] Assignee: Schlumberger Technology Corporation, Sugar Land, Tex.

[21] Appl. No.: 828,527

[22] Filed: Mar. 31, 1997

[51] Int. Cl.$^6$ ............................. E21B 33/14; C04B 11/30
[52] U.S. Cl. ..................... 166/293; 106/722; 106/732; 106/735; 106/820; 166/309
[58] Field of Search ...................... 166/292, 293, 166/309; 106/718, 719, 722, 732, 735, 280, 122

[56] References Cited

U.S. PATENT DOCUMENTS

| | | |
|---|---|---|
| 3,804,058 | 4/1974 | Messenger . |
| 3,847,635 | 11/1974 | Lange et al. ..................... 106/732 X |
| 3,852,081 | 12/1974 | Lehman ............................ 106/732 X |
| 3,902,911 | 9/1975 | Messenger . |
| 4,028,125 | 6/1977 | Martin . |
| 4,176,720 | 12/1979 | Wilson . |
| 4,252,193 | 2/1981 | Powers . |
| 4,478,640 | 10/1984 | Holland . |
| 4,482,379 | 11/1984 | Dibrell et al. . |
| 4,721,160 | 1/1988 | Parcevaux et al. . |
| 4,935,060 | 6/1990 | Dingsoyr . |
| 5,110,839 | 5/1992 | Chao ........................................ 521/83 |
| 5,164,004 | 11/1992 | Kurty .................................. 106/735 X |
| 5,207,830 | 5/1993 | Cowan et al. ........................... 106/672 |
| 5,340,513 | 8/1994 | Koslowski et al. ....................... 264/42 |
| 5,447,198 | 9/1995 | Kunzi et al. . |
| 5,484,019 | 1/1996 | Griffith . |
| 5,503,671 | 4/1996 | Casabonne et al. . |
| 5,594,050 | 1/1997 | Audebert et al. . |
| 5,696,059 | 12/1997 | Onan et al. ......................... 166/293 X |

FOREIGN PATENT DOCUMENTS

| | | |
|---|---|---|
| 2 376 620 | 1/1977 | France . |
| 2 463 104 | 7/1980 | France . |

OTHER PUBLICATIONS

Kirk–Othmer, "Calcium Compounds (Calcium Sulfate)", *Encyclopedia of Chemical Technology,* Third Edition, vol. 4, pp. 438–449.

Erik B. Nelson et al, *Well Cementing,* (Schlumberger Educational Services, Texas, 1990) pp. 2–1, 7:2–3, 14:14–17.

*Primary Examiner*—George A. Suchfield
*Attorney, Agent, or Firm*—John E. Vick, Jr.

[57] ABSTRACT

Foamed cement slurry compositions and a process or method for cementing well casings or pipes utilizing such compositions are described, the compositions being characterized by critical ratios of particular solid and liquid components. The slurry compositions formed provide unique properties such as rapid set or hydration, and are designed particularly for use with weakly consolidated formations.

38 Claims, 3 Drawing Sheets

COMPOSITIONS AND METHODS FOR CEMENTING A WELL

FIELD OF THE INVENTION

This invention relates to cement compositions useful in well completions and to methods for cementing a well.

BACKGROUND OF THE INVENTION

After drilling a well, such as an oil well, conductor casing or pipe and surface casing are commonly lowered into the wellbore. Cement slurry is then pumped, perhaps in stages, downhole through the casings and back up into the space or annulus between the casings and the wall of the wellbore, in amount sufficient to fill the space. Upon setting, the cement stabilizes the casings in the wellbore, prevents fluid exchange between or among formation layers through which the wellbore passes, and prevents gas from rising up the wellbore.

With weakly consolidated formations, special attention must be paid to the cementing of the casings or pipes since such formations pose significant difficulties not normally encountered. For example, in offshore locations where the upper layer of seabed is relatively unconsolidated, such as sedimentary formations in locations in the Gulf of Mexico, the weakness of the upper seabed formation around the borehole may be such that fracturing of the formation may occur as a result of the cementing operation. Again, if an overpressure of gas or water exists in the bed, influx of these fluids into the borehole may occur. Overpressured, unconsolidated sands, commonly referred to as shallow water flows, may force water and sand into lower pressure wellbores, with possibly catastrophic consequences.

Additionally, the relatively low temperatures of the seabottom and possibly the upper layer of the seabed present a problem with respect to the hydration or setting of hydraulic cement slurries. In the case of deepwater wells, temperature at seabottom may be 4° C., and, in Arctic regions, may be as low as 0° C. These low temperatures have the effect of delaying the setting time of the cement slurries. Not only does the lengthened setting time increase the time the well is out of production, drilling operations must remain suspended, leading to high peripheral costs.

To overcome these problems, a variety of techniques and compositions have been employed. To avoid fracturing the sandy or unconsolidated (shallow water) formations, lighter or lower density cement slurries have been designed. These slurries have generally possessed a mean density of from about 11 pounds per gallon of slurry to about 13 pounds per gallon of slurry, although some lower density slurries have been reported. Commonly, a slurry is lightened by increasing the proportion of water present or added, and, in order to avoid separation of the liquid and the solid phases, the viscosity of the slurry is increased by addition of a viscosifying agent such as bentonite or sodium silicate. Addition of such components will normally bring the water/solids weight ratio into a range of from about 0.5 to 1.8 or higher, based on the total weight of the slurry. Unfortunately, as is well known, the increased proportion of water is detrimental to compressive strength and increases the setting time of the cement.

Again, slurries have been lightened by other means, including the addition of an inert gas to foam the slurry. For example, U.S. Pat. No. 5,484,019 describes a foamed cement slurry formed by foaming a blend which comprises Portland cement, a fraction of cement of microparticulate fineness, and an aqueous fluid. In another approach, France patent 2,463,104 discloses the addition of silica dust to the cement, while U.S. Pat. No. 3,804,058 describes the use of hollow ceramic spheres.

Finally, the problem of low temperature has been addressed by some workers by the addition of various additives for the purpose of accelerating setting time, occasionally with negative effects on the quality of the slurry and on that of the finished cement. In the case of the aforementioned U.S. Pat. No. 5,484,019, for example, a large amount of $CaCl_2$, a well known accelerator, is shown as blended in the slurry to decrease the setting time. However, the selection of and blending of appropriate concentrations of such accelerators must be undertaken with care and precision to avoid premature setting and uneven setting times of the positioned cement slurry.

In sum, there has existed a need for a cement composition which avoids or overcomes the problems mentioned, and which provides a properly cemented well casing annulus. The invention addresses that need.

SUMMARY OF THE INVENTION

Figure 1:
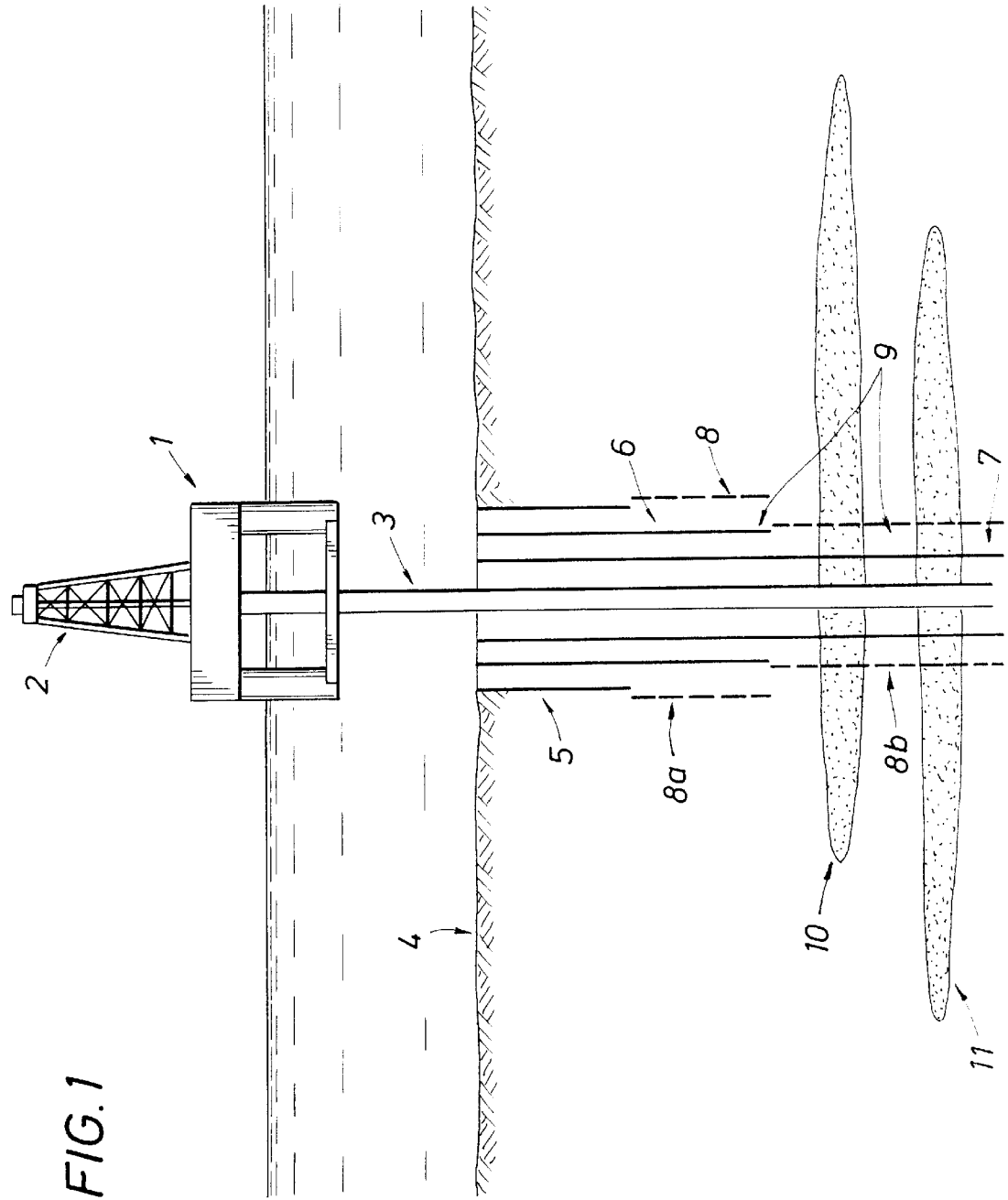
FIG. 1 illustrates schematically an off-shore rig and application of the invention in the circumstance of overpressured zones.

The invention, therefore, relates to novel foamed cement compositions and to a method for cementing well casings or pipes utilizing such compositions. More particularly, the invention, in one embodiment, relates to a low-density foamed cement slurry composition formed by 1) blending at least a) Portland cement; b) plaster of Paris; c) aqueous fluid; d) foaming agent; and e) foam stabilizing agent, in precise and effective proportions, to form a cementitious slurry mixture; and then 2) foaming the cementitious slurry mixture with an inert foaming gas. Preferably, a set retarding agent is also blended in the slurry mixture or with one or more of the components used to form the slurry mixture. According to the invention, the solid and liquid components are thus blended in precise ratios, and the foaming gas is applied in specified amounts, to form a novel foamed cement slurry, the slurry formed providing unique properties, as described more fully hereinafter. Unless otherwise specified or apparent from the context herein, all ratios or percentages mentioned with respect to solid and liquid components are given by weight, and the ratio or amount of foaming gas is by volume. Again, to the extent the slurry composition may be defined by the ingredients used in its formulation, the slurry comprises a) Portland cement; b) from about 0.6 parts to about 3.0 parts plaster of Paris per part of Portland cement; c) an aqueous fluid, the ratio of parts water in the aqueous fluid to total parts of Portland cement and plaster of Paris being from about 0.3 to about 0.5; d) an effective amount each of a foaming agent and a foam stabilizing agent; and an effective amount of an inert foaming gas, it being understood that these components are identified as they exist prior to coming into contact with each other and are identified as components or ingredients to be brought together in forming the slurry. Accordingly, a claim or claims hereinafter defining a slurry composition comprising components and/or ingredients, rather than as a slurry formed by blending components or having components blended together and foaming, specify the substance, component, or ingredient as it existed at the time just before it was first contacted, blended or mixed with one or more other components and/or ingredients in accordance with the present disclosure, it being further understood that a component may lose its identity through a chemical reaction or transformation during the preparation of the slurry composition.

In a second embodiment, the invention relates to a process or method for cementing a casing provided in a wellbore comprising formulating a low-density foamed cement slurry by 1) blending at least a) Port-land cement; b) plaster of Paris; c) aqueous fluid; d) foaming agent; and e) foam stabilizing agent, in precise and effective proportions, to form a cementitious slurry mixture; then 2) foaming the cementitious slurry mixture with an inert foaming gas; pumping the low-density foamed cement slurry down the wellbore and introducing said foamed cement slurry into the annulus between the casing and the borehole; and allowing the foamed cement slurry to set. For simplicity herein, the term "casing" is employed with respect to pipe utilized or provided as the conductor pipe or casing and the surface casing, or other well pipe positioned below these in a wellbore requiring a particularly stabilized wellbore. In yet a third embodiment, the invention relates to the final cement composition produced by such method in the wellbore. Accordingly, the invention provides compositions and methods for cementing a well which give effective control of unconsolidated formations and rapid setting in a low temperature environment.

DETAILED DESCRIPTION OF THE INVENTION

As indicated, the slurry compositions of the invention are prepared by blending the components to form a cementitious slurry and foaming the slurry in the proportions and manner mentioned. Accordingly, at least Portland cement, plaster of Paris, an aqueous fluid, a foaming agent, and a foam stabilizing agent are mixed, in any sequence or portions of components desired (so long as the final proportions specified are obtained), in a manner consistent with good blending practices followed by those skilled in the art. Other components, such as those commonly present or added in well cementing compositions, may be added or blended, so long as they do not interfere with the desired properties of the slurry and the set cement compositions of the invention. Preferably, as indicated, a set retarding agent is blended with the slurry or one or more components of the mixture. Generally, the dry solids are mixed or blended first or apart from the liquid(s), and then the liquid components are added and blended, or, optionally, all or part of the liquids may be blended before addition to the solids. Alternately, minor quantities of normally solid components, such as solid foaming or stabilizing agents, may be mixed and at least partially dissolved in the liquid and added in this manner to the dry solids mix. Blending procedures and equipment to prepare the cementitious slurry compositions of the invention are well known to those skilled in the art, as described, for example, in Well Cementing, edited by E. I. Nelson, Schlumberger Educational Services (1990).

The cementitious slurry or blend so formed is then foamed by appropriate intimate mixture or contact with a suitable foaming gas which is applied under pressure sufficient to foam the slurry. The foaming operation will generally be conducted prior to entry into the string, but the cementitious slurry may be foamed as it is entering the string. As in the case of the solids-liquids blending, suitable foaming procedures and equipment for cementitious slurries are known to those skilled in the art, and are also described in the aforementioned Well Cementing text.

The components for the foamed cement slurry of the invention are provided in critical proportions in order to achieve the desired results. Unless otherwise indicated, ratios specified hereinafter are given per part of Portland cement blended. Accordingly, Portland cement, from about 0.6 part to about 3.0 parts plaster of Paris (preferably from about 0.6 part to about 2.0 per parts) of said Portland cement; sufficient aqueous fluid to provide a ratio of from about 0.3 part to about 0.5 part water per total parts of Portland cement and plaster of Paris; and effective amounts, respectively, preferably from about 0.005 part to about 0.1 part, each, of a foaming agent and a foam stabilizing agent per total part of Portland cement and plaster of Paris are blended, as described, to form the cementitious slurry mixture. The cementitious slurry mixture is then foamed with an inert foaming gas to produce the foamed slurry compositions of the invention. Preferably, per part of Portland cement, from 1.2 part to 2.0 parts alpha plaster are provided, from 0.35 part to 0.4 part water per total part of Portland cement and plaster of Paris are provided, and from 0.007 part to 0.009 part each of foaming agent and foam stabilizing agent are provided.

Any ordinary type Portland cement may be used in the blending of the slurry compositions of the invention. As used herein, the phrase "Portland cement" is understood to include mixtures of this type of cement, in all proportions. Preferably, ASTM type I, II, III, IV, and V, or API cement class A, C, G, or H, or mixtures thereof, are employed, with Portland class C cement being most preferred.

A principal and critical component employed in blending of the slurry compositions of the invention is plaster of Paris, $CaSO_4 \cdot \frac{1}{2}H_2O$. Depending on the preparation process, plaster of Paris is commonly available as alpha ($\alpha$) or beta ($\beta$) plaster. Although both varieties, or a mixture thereof, may be employed in the invention, in the proportions specified, alpha plaster is preferred. The large proportion of plaster of Paris, i.e., 60 percent to 300 percent by weight, preferably 60 to 230 percent by weight, in relation to the Portland cement, is important in achieving the rapid setting characteristics of the compositions of the invention and distinguishes the invention compositions from many prior art cement compositions.

Any suitable aqueous fluid may be employed in slurrying the solids. As used herein, the phrase "aqueous fluid" is understood to include fresh water, salt water, sea water, or other suitable aqueous base liquid, so long as any other constituents of the aqueous liquid do not interfere with the desired formation and characteristics of the compositions of the invention. As will be understood by those skilled in the art, the aqueous fluid may comprise a variety of additive components, constituents, or impurities, as are common in well cementing operations. The ratio of water in the aqueous fluid supplied to the total weight of cement and plaster of Paris is critical, and will range, as indicated, from about 0.3 to about 0.5, i.e., from 30 percent to 50 percent by weight.

In order to ensure proper development of a foamed slurry and maintenance thereof, a suitable foaming agent and foam stabilizer or stabilizing agent are blended, in the proportions mentioned. Those skilled in the art may select appropriate foaming agents and foam stabilizers from those commercially available, selection being dependent to some degree on the character of the aqueous fluid being utilized. In general, anionic surfactants are preferred as foaming agents, while foam stabilizers may be selected from surfactants, polymers, latices, or even solids. Mixed surfactant foaming agents, in which an ionic surfactant is blended with a nonionic surfactant, may be used. Long chain alcohols are preferred as stabilizing agents. As used herein, the phrases "foaming agent" and "foam stabilizer" are understood to include mixtures, respectively, thereof.

Suitable foaming gases are also known, and the selection of a particular foaming gas per se forms no part of the invention, being a matter well within the ability of those skilled in the art. Any available inert gas or mixture of inert gases which may be applied with sufficient pressure to generate foam in the cementitious slurry mixture may be used. The term "inert" is used in its common sense, and simply indicates that the gas or gases do not react with the slurry or components thereof or otherwise interfere with the placement and setting of the foamed slurry. Nitrogen, air, and mixtures thereof, are preferred, or gases such as helium, etc., may be used. The inert foaming gas is supplied in an amount sufficient to foam the cement, and the cement upon setting will retain at least a significant portion of the inert foaming gas. The volume of the inert gas in the cement slurry at a particular location, in place, will vary depending on the original amount employed and the depth and temperature of the location. Preferably, sufficient foaming gas will be applied that the foamed slurry contains a minimum of about 1 percent by volume of foaming gas at the deepest placement level to about 40 percent of foaming gas at the highest placement level, under the conditions of temperature and pressure existing in the wellbore upon the placement of the slurry in the wellbore (i.e., in place). The final set compositions of the invention may thus contain, for example, from about 40 percent by volume of the inert gas at the top of the cemented annulus segment to about one percent by volume at the bottom of the segment.

To prevent fluid loss, a fluid loss agent or agents are commonly blended. Any suitable fluid loss agent may be employed in the invention, so long as it is compatible with and does not interfere with other components added or present. Preferred fluid loss agents include cellulosic polymers, polyamine sulfonated aromatic polymers, polyvinyl alcohol, AMPS co-polymers or terpolymers, bentonite, and latices. Fluid loss agents based on polyvinyl alcohol, e.g., as described in published European Patent Application 0,705,850, and U.S. Pat. No. 5,594,050, are preferred. Other fluid loss agents, such an anionic co- or terpolymers derived from acrylamide, especially those based on AMPS (2-acrylamido-2-methylpropanesulfonic acid) may also be used. The amount of fluid loss additive will be that required to give the desired result, i.e., and effective amount, and generally range from about 0.005 to about 0.1 part or more, preferably from about 0.02 to about 0.04 part per total parts of Portland cement and plaster of Paris. The term "fluid loss agent" is understood hereinafter to include mixtures thereof.

Commonly, a dispersant or dispersants are utilized to improve the pumpability of cement slurries. Any suitable dispersant or mixture thereof may be used in the compositions of the invention, and the particular dispersant used may be selected by those skilled in the art. The term "dispersant", as used hereinafter, is taken to include mixtures of such, particularly preferred dispersants including hydroxylated polysaccharides, hydroxycarboxylic acids, lignosulfonates, polymelamine sulfonate, polynaphthalene sulfonate, and polystyrene sulfonate. The dispersant added will be blended or added in a sufficient or effective amount, and preferably from 0.01 to 0.04 part or more per total parts of Portland cement and plaster of Paris.

Unlike many prior art cement slurries, the cement slurry compositions of the invention are characterized by rapid set and by rapid passage through what may be termed the critical hydration period. The critical hydration period is considered to be the period of time that begins when the slurry no longer transmits hydrostatic pressure that overbalances the pore pressure of the formation and ends when the slurry has developed sufficient cohesive strength to prevent the entry and flow of reservoir fluids into the annulus. Accordingly, the slurry composition of the invention is preferably prepared at the site, i.e., at or on the rig, and normally just before use, and the presence or blending of an effective amount of set retarding agent or agents is, as indicated, preferred in the compositions of the invention. The set retarding agent allows all the necessary cementing procedures to be conducted, yet, by limiting the amount blended, allows the prompt setting action accruing from the use of plaster of Paris.

A variety of such set retarding agents may be blended. For example, alkali or alkaline earth salts of lignosulfonates, alkali or alkaline earth salts of hydroxycarboxylic acids, saccharides, cellulosic compounds, various organophosphonates, acids and salts thereof, and various oxides may be employed. Particularly preferred are the lignosulfonates, e.g., sodium lignosulfonate, and alkali or alkaline earth salts of citric acid. The amount blended will depend on the particular retarder chosen and the length of time the delay of the set of the cementitious slurry is desired. Preferably, the set retarding agent or agents will be supplied in an amount of from about 0.001 to about 0.1 part or more, most preferably from about 0.005 to about 0.015 part per total parts of Portland cement and plaster of Paris. In the case of the lignosulfonates, for example, an effective amount of the agent added would be from about 0.005 to about 0.015 parts of the set retarder per part of the cementitious slurry, resulting in a set or cure time of from 4 to 8 hours in place. As utilized herein, the expression "set retarding agent" is understood hereinafter to include mixtures thereof, in all proportions.

For a fuller understanding of the invention, reference is made to the drawing, which illustrates a typical application of the compositions and method of the invention. Accordingly, in FIG. 1, there is shown an offshore drilling platform 1 containing a drilling rig 2 with drill string 3 extending below the seabed 4 and drive pipe 5 to near the bottom of the conductor pipe or casing 6, and surface pipe 7. Conductor pipe 6 is positioned in the segment 8a of borehole 8, while surface pipe 7 is in reduced diameter section 8b of the same borehole. The borehole forms an annulus 9 with pipes 6 and 7. Below the surface of seabed 4 (often referred to as the mud line) overpressured zones 10 and 11 are illustrated, posing the problem of shallow water flow or gas influx into wellbore 8. To prevent fluid influx from the overpressured zones 10 and 11, the conductor pipe or casing 7 is cemented utilizing the novel foamed cement slurry of the invention.

More particularly, the foamed cement slurry of the invention is prepared on the surface as described previously, and is pumped downhole and into the annulus 9 surrounding the conductor pipe 6 and the surface pipe 7, preferably in stages. The slurry is allowed to set or hydrate, and because of the unique character and properties of the cement slurry of the invention, the fluid in zones 10 and 11 is prevented from entering the wellbore.

Figure 2:
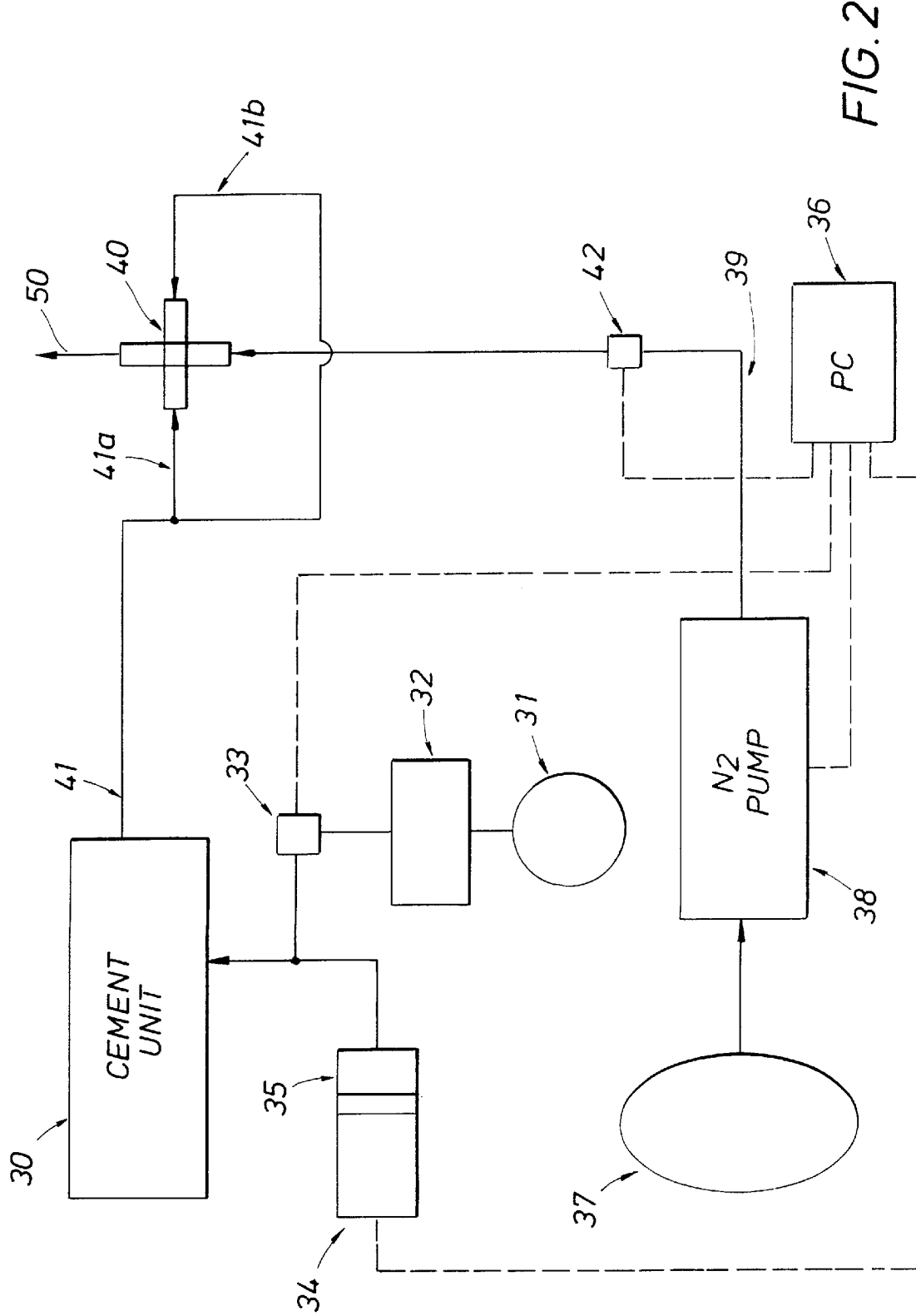
FIG. 2 is a schematic flow diagram of a preferred blending procedure according to the invention.

FIG. 2 illustrates a preferred manner of blending the foamed slurry compositions and process of the invention. Accordingly, there is shown a cement mixing or blending unit 30 which receives solid and liquid components as a slurry from premixing units 31 and 32. Mass flow meter 33 measures flow of the base cement slurry from units 31 and 32, while a positive displacement servo controlled piston pump 34 and magnetic flow meter 35 regulate the amounts of foaming agent and other surfactant supplied from a source or sources (not shown). The measured flow rate of the base cement slurry at 33 is fed to a ruggedized process control computer 36. Nitrogen from a source 37 is supplied via pump 38 and line 39 to foam generator 40 where it is mixed with and foams cementitious slurry supplied via lines 41, 41a, and 41b. Line 39 further contains a mass flow meter 42 to measure nitrogen flow from pump 38, and the measured output is fed to controller 36. The measured flow rate of the base cement slurry at 33 is also fed to the process control computer 36. Upon receiving the signals from 33 and 42, the process controller 36 signals the surfactant pump 34 to provide foaming agent to the slurry mixing unit 30, and nitrogen flow is controlled from controller 36 by a servo controller (not shown) which regulates pump 38 so that the proper ratios of slurry mixture and nitrogen are supplied to the foam generator 40. Foamed cement slurry in line 50 is then pumped downhole.

Figure 3:
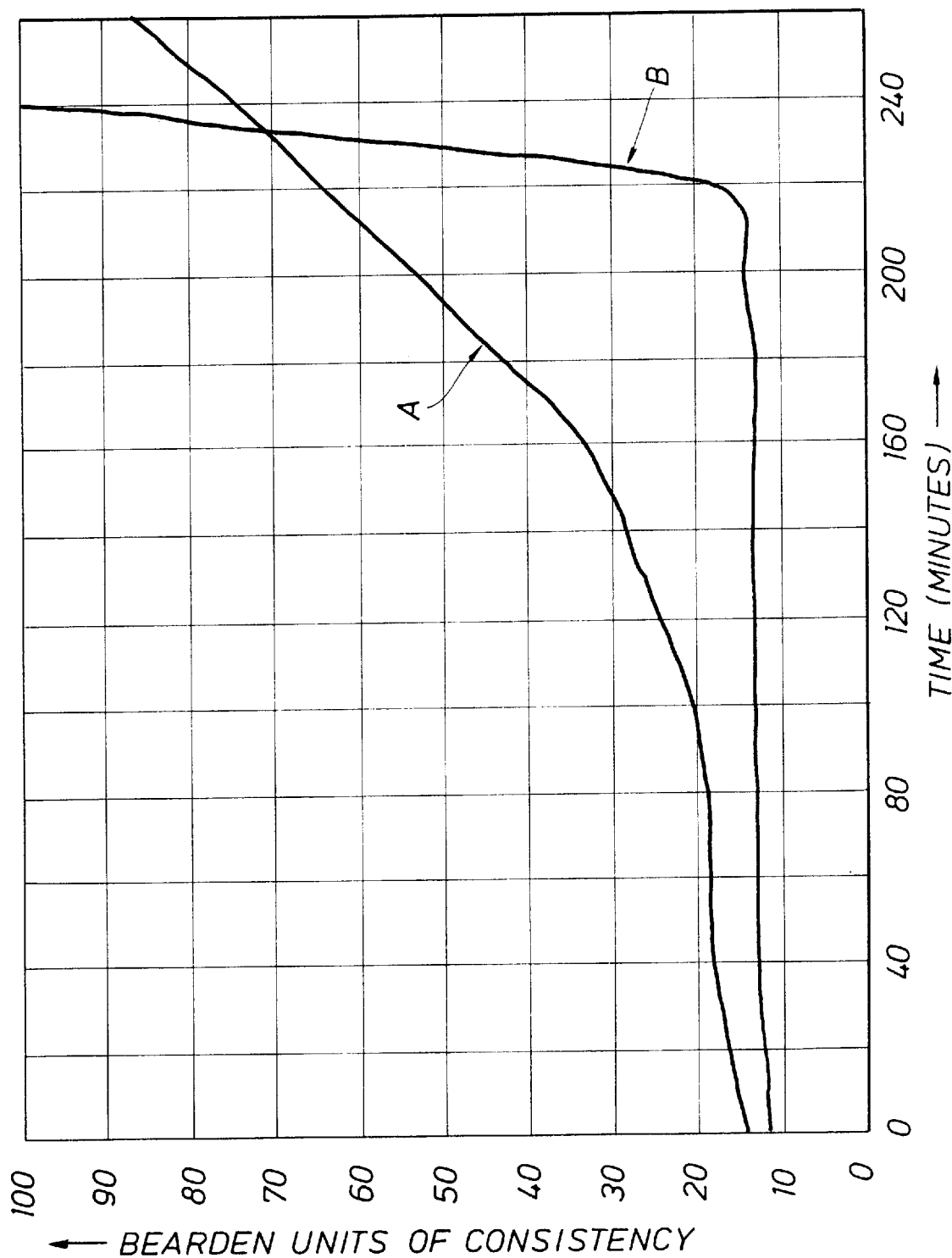
FIG. 3 is an idealized graphic illustration of the setting characteristics of a prior art cement and the foamed cement slurry according to the invention.

The foamed slurry of the invention is characterized by or displays the important "right angle set" (RAS) property which is valuable in avoiding the shallow water and low temperature problems mentioned. In particular, and with reference to FIG. 3, there is shown an idealized comparison of the increase in consistency, i.e., a decrease in pumpability, of a typical cement slurry (line A) with the foamed slurry of the invention (line B). As will be appreciated by those skilled in the art, the curve A represents gradual development through the critical hydration period, and, because the internal cement structure will be weak and the permeability is high, fluid flow and migration can occur if formation pressure is sufficient. On the other hand, curve B illustrates a rapid consistency increase over a short time, which decreases the possibility of a shallow water flow or gas influx. In general, as indicated, compositions according to the invention develop sufficient compressive strength to ensure proper support of the conductor pipe or other casings in 8 hours or less, at a temperature of 4° C., compared with conventional cement slurries which may need in excess of 24 hours at this temperature.

The following procedure was conducted.

Two offshore wells in a block in 3,665 feet of water in the Gulf of Mexico had experienced serious shallow water flows during drilling and one had to be abandoned because of uncontrolled flow. Accordingly, in drilling a third well, a 26 inch conductor casing was set at 985 feet below mud line, approximately 165 feet above the highest shallow water sand as indicated by seismic data. The 26 inch casing was cemented using a foamed cement according to the invention, and then a pilot hole was drilled to a depth of 1,853 below mud line. Four separate flowing sands were encountered during this phase. The hole was then opened to 26 inches, a 20 inch surface casing run, and the latter was cemented according to the invention, as more fully described as follows.

More particularly, a first cement slurry was prepared by blending 1100 sacks, in a ratio of 60/40 plaster/API Portland Class C cement (each sack is composed of 60 pounds of α plaster and 40 pounds of Portland cement), 0.35 gal/sack chemical crosslinked polyvinyl alcohol, 0.05 gal/sack of polymelamine sulfonate, 0.06 gal/sack of sodium lignosulfonate, 0.1 gal/sack each of commonly used surfactant blends F52.1 and D139, respectively a blend of ammonium fatty alcohol ether sulfate, fatty alcohol surfactant, inorganic salt, and solvent, and a blend of polyglycols, oxyalkylates, and solvent, and sufficient water to reach a base density of 15.8 lb/gal. Nitrogen was then added to the mixture in a foam generating unit at a rate of 179 SCF per barrel of slurry, to produce a foamed cement slurry having a density of 12.5 to 13.4 lb/gal. (downhole). The cement slurry was prepared in a process controlled mixer into which the nitrogen and liquid additives were added at the proper ratios via a computer process control system, and the foamed slurry was then pumped downhole. The foamed slurry had thickening times (measured at 70° F.) as follows:

| Time (hrs.) | Beardon Units (Bc) |
|---|---|
| 5:31 | 30 |
| 5.55 | 70 |
| 6:07 | 100 |

The foamed slurry thus clearly demonstrated the desirable right angle set property. Free water content was 0.00 ml, fluid loss (measured at 70° F.) of the base slurry was 36 ml/30 min, and compressive strength (at 51° F.) was, as follows:

| Time | PSI |
|---|---|
| 12 hours | 500 |
| 24 hours | 550 |
| 48 hours | 1000 |

The lead slurry was then followed by a second or tail stage foamed cement slurry of similar composition, except that 1585 sacks of the plaster/cement composition was employed. The base slurry had a density of 15.8 lb/gal., and the nitrogen was added at a rate of 53 SCF per barrel of slurry, producing a foamed slurry having a density of 15.0 to 15.1 lb./gal. downhole. Finally, a third RAS portion, non-foamed, and having a density of 15.8 lb./gal., was added as a tail.

Having thus described the invention, those skilled in the art will recognize that such description is given by way of illustration and not by way of limitation. As mentioned, the compositions of the invention may include other non-interfering constituents for particular purposes, as will be evident to those skilled in the art. The invention is adapted to a variety of well cementing applications, in addition to those in shallow water zones, such as operations in areas of permafrost, weak sediment zones, and in low temperature zones in general.

What is claimed is:

1. A low-density foamed cement slurry composition formed by
   1) blending a cementitious slurry mixture from components comprising
      a) Portland cement;
      b) alpha plaster of Paris, the ratio of alpha plaster of Paris to Portland cement being from about 0.6 part to about 3.0 part per part of Portland cement;
      c) water, the ratio of water to total parts of Portland cement and alpha plaster of Paris being from about 0.3 to about 0.5;
      d) a foaming agent and a foam stabilizing agent, each in an effective amount;
   and
   2) foaming the cementitious slurry mixture with an inert foaming gas selected from nitrogen, air, and a mixture of nitrogen and air.

2. The composition of claim 1 wherein the foaming agent and the foam stabilizing agent are blended in a ratio of 0.005 part to 0.1 part each per total parts of Portland cement and alpha plaster of Paris.

3. The composition of claim 1 wherein the cementitious slurry mixture or one or more components used in forming the cementitious slurry mixture has blended therein an effective amount of a set retarding agent.

4. The composition of claim 3 wherein the set retarding agent is blended in a ratio of 0.001 part to 0.1 part each per total parts of Portland cement and alpha plaster of Paris.

5. The composition of claim 1 wherein the cementitious slurry mixture is foamed with sufficient inert foaming gas to provide from about 1 to about 40 percent by volume of inert gas in the cement slurry in place.

6. The composition of claim 3 wherein the cementitious slurry mixture or one or more components used in forming the cementitious slurry mixture has blended therein an effective amount of a fluid loss agent.

7. The composition of claim 2 wherein the cementitious slurry mixture or one or more components used in forming the cementitious slurry mixture has blended therein from about 0.005 part to about 0.1 part of a fluid loss agent per total parts of Portland cement and alpha plaster of Paris.

8. The composition of claim 3 wherein the cementitious slurry mixture or one or more components used in forming the cementitious slurry mixture has blended therein from about 0.005 part to about 0.1 part of a fluid loss agent.

9. The composition of claim 8 wherein the water is selected from fresh water, salt water, or sea water.

10. The composition of claim 9 wherein the cementitious slurry mixture or one or more components used in forming the cementitious slurry mixture has blended therein an effective amount of a dispersant.

11. The composition of claim 7 wherein the cementitious slurry mixture or one or more components used in forming the cementitious slurry mixture has blended therein from about 0.01 part to about 0.04 part of a dispersant per total parts of Portland cement and alpha plaster of Paris.

12. A process for cementing a casing provided in a wellbore comprising
   1) formulating a foamed cementitious slurry mixture, by blending at least
      a) Portland cement;
      b) plaster of Paris, the ratio of plaster of Paris to Portland cement being from about 0.6 part to about 3.0 part per part of Portland cement;
      c) aqueous fluid, the ratio of water in the aqueous fluid to total parts of Portland cement and plaster of Paris being from about 0.3 to about 0.5;
      d) a foaming agent and a foam stabilizing agent, each in an effective amount;
   2) foaming the cementitious slurry mixture with an inert foaming gas to form a low density foamed cement slurry;
   3) pumping the low-density foamed cement slurry down the wellbore and introducing said foamed cement slurry into the annulus between the casing and the borehole;
   4) allowing the foamed cement slurry to set.

13. The process of claim 12 wherein an effective amount of a set retarding agent is blended with the cementitious slurry mixture or with one or more components used in forming the cementitious slurry mixture, and the plaster of Paris is alpha plaster of Paris.

14. The process of claim 12 wherein the foaming agent and the foam stabilizing agent are blended a ratio of 0.005 part to 0.1 part each per total parts of Portland cement and plaster of Paris.

15. The process of claim 12 wherein the cementitious slurry mixture is foamed with sufficient inert foaming gas to provide from about 1 to about 40 percent by volume of inert gas in the cement slurry in place.

16. The process of claim 12 wherein the cementitious slurry mixture or one or more components used in forming the cementitious slurry mixture has blended therein an effective amount of a fluid loss agent.

17. The process of claim 16 wherein the cementitious slurry mixture or one or more components used in forming the cementitious slurry mixture has blended therein from about 0.005 part to about 0.15 part of a fluid loss agent per total parts of Portland cement and alpha plaster of Paris.

18. The process of claim 12 wherein the aqueous fluid is fresh water, salt water, or sea water.

19. The process of claim 16 wherein the cementitious slurry mixture or one or more components used in forming the cementitious slurry mixture has blended therein an effective amount of a dispersant.

20. The process of claim 12 wherein the cementitious slurry mixture or one or more components used in forming the cementitious slurry mixture has blended therein from about 0.01 part to about 0.04 part of a dispersant per total parts of Portland cement and plaster of Paris.

21. A process for cementing casing in a wellbore comprising
   1) blending a cementitious slurry mixture from
      a) Portland cement;
      b) plaster of Paris, the ratio of plaster of Paris to Portland cement being from about 0.6 part to about 3.0 part per part of Portland cement;
      c) aqueous fluid, the ratio of water in the aqueous fluid to total parts of Portland cement and plaster of Paris being from about 0.3 to about 0.5;
      d) a foaming agent and a foam stabilizing agent, each in an effective amount;
   2) foaming the cementitious slurry mixture with an inert foaming gas to form a low-density foamed cement slurry;
   3) pumping the low-density foamed cement slurry down the wellbore and introducing said foamed cement slurry into the annulus between the casing and the borehole;
   4) allowing the foamed cement slurry to set.

22. The process of claim 21 wherein an effective amount of a set retarding agent is blended with the cementitious slurry mixture or with one or more components used in forming the cementitious slurry mixture, and the plaster of Paris is alpha plaster of Paris.

23. The process of claim 21 wherein the cementitious slurry mixture is foamed with sufficient inert foaming gas to provide from about 1 to about 40 percent by volume of inert gas in the cement slurry in place.

24. The process of claim 21 wherein the cementitious slurry mixture or one or more components used in forming the cementitious slurry mixture has blended therein an effective amount of a set retarding agent and an effective amount of a fluid loss agent.

25. The process of claim 21 wherein the cementitious slurry mixture or one or more components used in forming the cementitious slurry mixture has blended therein from about 0.005 part to about 0.1 part of a fluid loss agent per total parts of Portland cement and alpha plaster of Paris.

26. The process of claim 21 wherein the aqueous fluid is fresh water, salt water, or sea water.

27. The process of claim 21 wherein the cementitious slurry mixture or one or more components used in forming the cementitious slurry mixture has blended therein an effective amount of a dispersant.

28. The process of claim 21 wherein the cementitious slurry mixture or one or more components used in forming the cementitious slurry mixture has blended therein from about 0.01 part to about 0.04 part of a dispersant per total parts of Portland cement and plaster of Paris.

29. A low-density foamed cement slurry composition formed by
1) blending a cementitious slurry mixture from components comprising
   a) Portland cement;
   b) plaster of Paris, the ratio of plaster of Paris to Portland cement being from about 0.6 part to about 1.5 part per part of Portland cement;
   c) aqueous fluid, the ratio of water in the aqueous fluid to total parts of Portland cement and plaster of Paris being from about 0.3 to about 0.5;
   d) a foaming agent and a foam stabilizing agent, each in an effective amount; and
2) foaming the cementitious slurry mixture with an inert foaming gas.

30. The composition of claim 29 wherein an effective amount of a set retarding agent is blended with the cementitious slurry mixture or with one or more components used in forming the cementitious slurry mixture, and the plaster of Paris is alpha plaster of Paris.

31. The composition of claim 30 wherein the cementitious slurry mixture is foamed with sufficient inert foaming gas to provide from about 1 to about 40 percent by volume of inert gas in the cement slurry in place.

32. The composition of claim 29 wherein the cementitious slurry mixture or one or more components used in forming the cementitious slurry mixture has blended therein an effective amount of a fluid loss agent.

33. The composition of claim 29 wherein the cementitious slurry mixture or one or more components used in forming the cementitious slurry mixture has blended therein from about 0.005 part to about 0.1 part of a fluid loss agent per total parts of Portland cement and plaster of Paris.

34. The composition of claim 29 wherein the aqueous fluid is fresh water, salt water, or sea water.

35. The composition of claim 29 wherein the cementitious slurry mixture or one or more components used in forming the cementitious slurry mixture has blended therein an effective amount of a dispersant.

36. The composition of claim 29 wherein the cementitious slurry mixture or one or more components used in forming the cementitious slurry mixture has blended therein from about 0.01 part to about 0.04 part of a dispersant per total parts of Portland cement and plaster of Paris.

37. A composition comprising low-density foamed cement formed by
1) blending a cementitious slurry mixture from at least
   a) Portland cement;
   b) plaster of Paris, the ratio of plaster of Paris to Portland cement being from about 0.6 part to about 3.0 part per part of Portland cement;
   c) aqueous fluid, the ratio of water in the aqueous fluid to total parts of Portland cement and plaster of Paris being from about 0.3 to about 0.5;
   d) a foaming agent and a foam stabilizing agent, each in an effective amount;
2) foaming the cementitious slurry mixture with an inert foaming gas to form a low-density foamed cement slurry; and
3) pumping the low-density foamed cement slurry down a wellbore and introducing said foamed cement slurry into the annulus between a casing and the wellbore, and allowing the low-density foamed cement slurry to set.

38. A low-density foamed cement slurry composition comprising
   a) Portland cement;
   b) plaster of Paris, the ratio of plaster of Paris to Portland cement being from about 0.6 part to about 3.0 part per part of Portland cement;
   c) aqueous fluid, the ratio of water in the aqueous fluid to total parts of Portland cement and plaster of Paris being from about 0.3 to about 0.5;
   d) a foaming agent and a foam stabilizing agent, each in an effective amount; and
   e) an effective amount of an inert foaming gas.

* * * * *